(12) United States Patent
Kim et al.

(10) Patent No.: US 12,096,237 B2
(45) Date of Patent: Sep. 17, 2024

(54) METHOD FOR PREDICTING STRUCTURE OF INDOOR SPACE USING RADIO PROPAGATION CHANNEL ANALYSIS THROUGH DEEP LEARNING

(71) Applicant: Seoul National University R&DB Foundation, Seoul (KR)

(72) Inventors: Seong-Cheol Kim, Seoul (KR); Jung-Yong Lee, Seoul (KR)

(73) Assignee: Seoul National University R&DBFoundation, Seoul (KR)

( * ) Notice: Subject to any disclaimer, the term of this patent is extended or adjusted under 35 U.S.C. 154(b) by 847 days.

(21) Appl. No.: 17/051,541

(22) PCT Filed: Apr. 30, 2018

(86) PCT No.: PCT/KR2018/005029
§ 371 (c)(1),
(2) Date: Sep. 29, 2021

(87) PCT Pub. No.: WO2019/212069
PCT Pub. Date: Nov. 7, 2019

(65) Prior Publication Data
US 2023/0045798 A1 Feb. 16, 2023

(30) Foreign Application Priority Data
Apr. 30, 2018 (KR) .......................... 10-2018-0049639

(51) Int. Cl.
*H04W 4/00* (2018.01)
*G06N 3/02* (2006.01)
(Continued)

(52) U.S. Cl.
CPC .............. *H04W 16/20* (2013.01); *G06N 3/02* (2013.01); *H04B 17/318* (2015.01);
(Continued)

(58) Field of Classification Search
None
See application file for complete search history.

(56) References Cited

U.S. PATENT DOCUMENTS 6,140,964 A * 10/2000 Sugiura .................... G01S 5/14
342/464
9,989,633 B1 * 6/2018 Pandey .................... G01S 3/32
(Continued)

FOREIGN PATENT DOCUMENTS

KR 10-2013-0106954 A 10/2013
KR 10-2015-0138003 A 12/2015
(Continued)

OTHER PUBLICATIONS

Dokmanic et al., "Can One Hear the Shape of a Room: The 2-D Polygonal Case;" Proceedings of the IEEE International Conference on Acoustics, Speech and Signal Processing (ICASSP 2011); May 2011; pp. 321-324; 4 Pages.
(Continued)

*Primary Examiner* — Bob A Phunkulh
(74) *Attorney, Agent, or Firm* — DALY, CROWLEY, MOFFORD & DURKEE, LLP

(57) ABSTRACT

A method for predicting a structure of an indoor space using radio propagation channel analysis through deep-learning is disclosed. Channel data of radio signals are collected for various indoor spaces, and radio channel parameter data such as PDP, AoA, and AoD are extracted therefrom. A large amount of propagation channel parameter data is input to an artificial neural network together with vertex coordinate data of the corresponding indoor space and deep-learning is performed in advance. The propagation channel parameter data are extracted from the indoor space to be predicted, the best matching indoor space is detected based on the trained (Continued)

artificial neural network. The best matching indoor space is predicted as the structure of the indoor space.

16 Claims, 9 Drawing Sheets

(51) Int. Cl.
  *H04B 17/318* (2015.01)
  *H04B 17/364* (2015.01)
  *H04W 16/20* (2009.01)
  *H04W 24/10* (2009.01)
  *G06N 20/00* (2019.01)
(52) U.S. Cl.
  CPC .......... *H04B 17/364* (2015.01); *H04W 24/10* (2013.01); *G06N 20/00* (2019.01)

(56) References Cited

U.S. PATENT DOCUMENTS

| | | | |
|---|---|---|---|
| 10,521,865 | B1* | 12/2019 | Spader ................ G06F 18/2413 |
| 2018/0063386 | A1* | 3/2018 | Sharma .................. H04N 23/60 |
| 2018/0268220 | A1* | 9/2018 | Lee ........................ G06V 20/20 |
| 2018/0308013 | A1* | 10/2018 | O'Shea .................. G06N 3/086 |
| 2019/0179270 | A1* | 6/2019 | Gervais ................ H04L 12/2827 |
| 2019/0182069 | A1* | 6/2019 | Gervais ................. H04L 12/282 |
| 2019/0184569 | A1* | 6/2019 | Huang ................. B25J 11/0085 |
| 2024/0031043 | A1* | 1/2024 | van Erven ........... H04B 17/318 |

FOREIGN PATENT DOCUMENTS

| | | |
|---|---|---|
| KR | 10-2016-0096742 A | 8/2016 |
| KR | 10-2017-0018143 A | 2/2017 |
| KR | 10-2017-0024631 A | 3/2017 |
| KR | 10-2017-0074322 A | 6/2017 |

OTHER PUBLICATIONS

International Search Report dated Feb. 28, 2019 for International Application No. PCT/KR2018/005029; 4 Pages.

* cited by examiner

FIG. 11
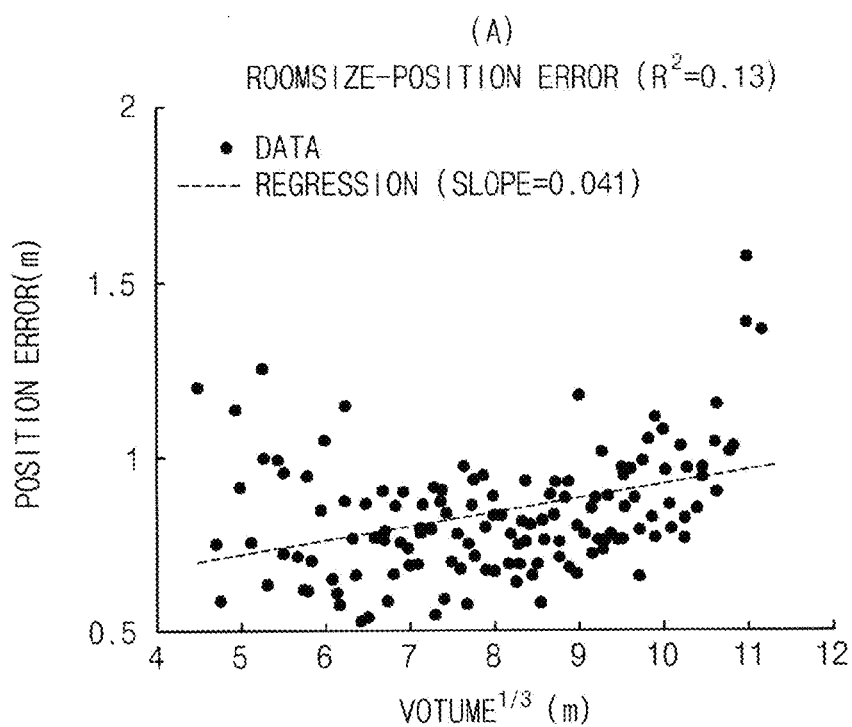
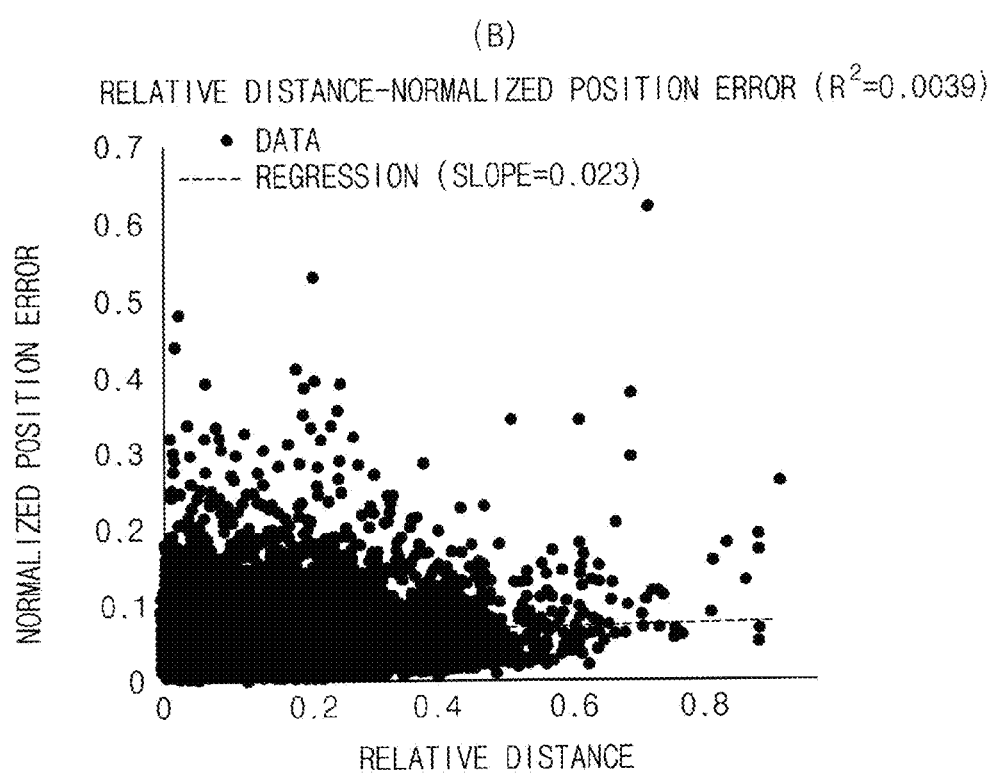

METHOD FOR PREDICTING STRUCTURE OF INDOOR SPACE USING RADIO PROPAGATION CHANNEL ANALYSIS THROUGH DEEP LEARNING

CROSS-REFERENCE TO RELATED APPLICATION

This application is a U.S. National Stage Application of International Application No. PCT/KR2018/005029 filed on Apr. 30, 2018 which is based upon and claims the benefit of priority to Korean Patent Application 10-2018-0049639, filed on Apr. 30, 2018 in the Korean Intellectual Property Office. The disclosures of the above-listed applications are hereby incorporated by reference herein in their entirety.

BACKGROUND

1. Technical Field

The present disclosure relates to a technology for estimating the structure of an indoor space, and more particularly, to a technology for estimating the shape of an indoor space using a radio signal.

2. Description of the Related Art

Recently, researches for analyzing the location of a device as well as a shape of the place where the device exists has been actively conducted. Checking the shape of a room in which the device is located can give a better result in applications such as realizing virtual reality of a place, calculating a moving path of a robot (e.g., calculating a cleaning path for a robot vacuum cleaner), and improving the radio propagation model of a room (e.g., calculating the optimal location of a wireless router). In other words, identification of room shape is an important issue. However, it is difficult to fully understand a space without directly analyzing the building schematic.

One of the prior art for predicting an indoor space is a technology for identifying the shape of a room using a camera or a visual sensor. A technology that uses the visual sensor is a technology for identifying the shape of a room without referring to a building schematic. However, this method has a disadvantage that the visual sensor is greatly affected by environmental factors such as the amount of light and the presence of obstacles. In addition, when processing image data from the visual sensor, hardware with high computational performance is required.

Instead of using the visual sensor, a technique for predicting an indoor space using, for example, an acoustic signal such as ultrasound has been also known. Dokmanic et al. proposed a method for estimating the shape of a room using an acoustic signal that is less affected by light in the environment in a paper (I. Dokmanic, YM Lu, M. Vetterli, "Can one hear the shape of a room: The 2-D polygonal case", Proc. ICASSP, pp. 321-324, 2011.). The proposed method estimates the shape of the room by substituting all the shapes of the room that can be inferred from a time domain impulse response (TIR) received after being reflected from the wall, floor, and ceiling when sound waves are emitted in the room. A matrix operation is performed to infer the shape of the wall from the TIR, and a technique is used to reduce possible combinations of interior shapes. It also reorders the delay profiles of the sound waves to estimate the shape of the room and detect possible combinations of walls to predict the location of the walls in the room. This work is the first proposed method to estimate the shape of a room using only the delay profile. Nevertheless, there is a disadvantage that performance cannot be guaranteed for various types of indoor spaces because empirical adjustment is required when rearranging the delay profile. In addition, the proposed method assumes a TIR measurement with infinitely precise resolution and examines all possible matrix combinations. Therefore, there is a disadvantage in that the amount of computation to be processed is very large. In addition, since the algorithm presented by the technique assumes that the signal undergoes only two reflections in the indoor environment, it is different from the actual indoor propagation channel environment where it undergoes multiple reflections more than two times. Therefore, it may be difficult to guarantee with certainty that the shape of the indoor space estimated by this method is accurate. It may be also necessary to estimate the shape of an indoor space with several rooms.

However, the acoustic signal has a property of being greatly affected by obstacles and cannot penetrate walls, etc. Thus, the method has also a disadvantage in that the technology scalability to accommodate such a request is weak.

SUMMARY

The present disclosure is to provide a method for predicting the structure of a room using a radio signal (wireless signal) that is less affected by obstacles.

The present disclosure is also to provide a method for predicting the structure of a room based on an artificial neural network obtained by collecting channel response data for various room structure environments in advance and deep-learning the collected data.

Some embodiments of the present disclosure provide a method for predicting a structure of an indoor space using deep-learning-based radio propagation channel analysis. The method for predicting the structure of the indoor space includes estimating propagation channel parameter data for learning for a plurality of indoor spaces for learning. Here, the propagation channel parameter data for learning are estimated from a radio signal received by a transceiver through multiple propagation channel paths by transmitting the radio signal while changing a position of the transceiver in each of the plurality of indoor spaces for learning. The method for predicting the structure of the indoor space includes deep-learning correspondence between the propagation channel parameter data for learning and structures of the indoor spaces for learning by using coordinate values of vertices of each of the plurality of indoor spaces and estimated propagation channel parameter data for learning as an input of an artificial neural network, and estimating first propagation channel parameter data from a first radio signal transmitted and then received through multiple propagation channel paths by a transceiver in an indoor space to be predicted. In addition, the method for predicting the structure of the indoor space includes predicting a structure of an indoor space that best matches the estimated first propagation channel parameter data after detecting the structure of the indoor space to be predicted based on the deep-learned artificial neural network.

In an embodiment of the present invention, the estimating of the propagation channel parameter data for learning may include transmitting, by a transmitter, the radio signal for learning in each of the indoor spaces for learning; receiving, by a receiver, the radio signal that has passed through the multiple propagation channel paths of the indoor space; and estimating the propagation channel parameter data for learning about the indoor spaces by analyzing the received radio signal.

In an embodiment of the present invention, the propagation channel parameter data for learning may include data obtained by using at least one of a power delay profile (PDP), an angle of arrival (AoA) profile and an angle of departure (AoD) profile of the radio signal as a propagation channel parameter.

In an embodiment of the present invention, when the receiver uses an omni-directional antenna, PDP data of the radio signal for learning may be estimated as the propagation channel parameter data for learning. The PDP may be is estimated using a least-squares method or a least-mean-square error method.

In an embodiment of the present invention, when the receiver uses an array antenna having directivity, the AoA profile of the radio signal may be estimated as the propagation channel parameter data.

In an embodiment of the present invention, when the transmitter uses an array antenna having directivity, the AoD profile of the radio signal may be estimated as the propagation channel parameter data.

In an embodiment of the present invention, the estimating of the propagation channel parameter data for learning may be performed using a 3-dimensional (3D) radio ray tracing method in a state where the transmitter and the receiver are located close to each other.

In an embodiment of the present invention, the estimating of the first propagation channel parameter data may include transmitting and receiving a first radio signal while rotating array antennas of a transmitter and a receiver of the transceiver when the transmitter and the receiver of the transceiver use the array antennas having directivity; and merging the data of the first radio signal received while rotating to generate an effect which is the same as an omni-directional antenna.

In an embodiment of the present invention, the deep-learning of the correspondence may include providing the coordinate values of the vertices of each of the plurality of indoor spaces and the propagation channel parameter data as input data for deep-learning of the artificial neural network; deep-learning, in the artificial neural network, the input propagation channel parameter data to obtain coordinate values of estimated vertices of corresponding indoor space; calculating a difference value between the coordinate values of the estimated vertices and coordinate values of actual vertices of the corresponding indoor space; adjusting a weight so that the difference value is reduced; and repeating calculating the difference value again by applying the adjusted weight, and terminating deep-learning the correspondence when the calculated difference value becomes smaller than a threshold value.

In an embodiment of the present invention, the estimating of the first propagation channel parameter data may include transmitting, by a transmitter located in the indoor space, the first radio signal; receiving, by a receiver located close to the transmitter in the indoor space, the first radio signal having passed through multiple propagation channel paths in the indoor space; and estimating first propagation channel parameter data for the indoor space by analyzing the transmitted and received first radio signal.

In an embodiment of the present invention, the predicting of the structure of the indoor space may include inputting the estimated first propagation channel parameter data into the trained artificial neural network to detect a structure of an indoor space that best matches the first propagation channel parameter data; and estimating coordinate values of the vertices of the indoor space with the detected structure as the coordinate values of the vertices of the indoor space to be predicted.

In an embodiment of the present invention, the first radio signal transmitted by the transmitter may be a preamble signal.

In an embodiment of the present invention, when the receiver uses an omni-directional antenna, PDP data of the first radio signal may be estimated as the first propagation channel parameter data.

In an embodiment of the present invention, when the receiver uses an array antenna having directivity, an AoA profile of the first radio signal may be further estimated as the first propagation channel parameter data.

In an embodiment of the present invention, when the transmitter uses an array antenna having directivity, an AoD profile of the first radio signal may be further estimated as the first propagation channel parameter data.

In an embodiment of the present invention, the first propagation channel parameter data may include at least any one of (i) PDP data of the first radio signal, or (ii) the PDP data of the first radio signal and at least one of AoA profile data and AoD profile data of the first radio signal.

In an embodiment of the present invention, the artificial neural network may be an artificial neural network having a multi-layer perceptron structure.

The method according to the present disclosure uses the radio signal to predict the structure of an indoor space. Since the radio signal can pass through the obstacle, the influence of the obstacle can be minimized on the prediction of the structure of the indoor space, so accurate estimation is possible. In addition, since the radio signal can pass through, for example, a wall structure, the technology of the present disclosure using the radio signals can be extended to a technology for estimating the shape of the indoor space having several partitioned indoor spaces. This is an advantage that can overcome the limitations of technology using sound waves.

The present disclosure is a method of learning in advance propagation channel parameter data for various indoor spatial structure environments, and detecting an indoor space structure that best matches the channel response of an actual radio signal based on the learned data. Therefore, the calculation time required to actually predict the structure of the indoor space can be significantly reduced compared to the prior art. Since the indoor structure can be estimated within a short time, using this point, the indoor structure can be more accurately estimated if the estimation is carried out at several positions while changing the transceiver's position several times.

In addition, the technology of the present disclosure has an advantage of overcoming the limitations of the visual sensor-based technology that requires a sufficient amount of light.

BRIEF DESCRIPTION OF THE DRAWINGS

FIG. 11 shows the results of analyzing the performance difference according to the environmental change, where (a) the left graph shows the estimation error change according to the change in the size of the indoor space, (b) the right graph shows the estimation error change according to the distance from the center of the indoor space.

DETAILED DESCRIPTION OF THE EMBODIMENTS

Hereinafter, example embodiments of the present disclosure will be described in detail with reference to the accompanying drawings.

Figure 1:
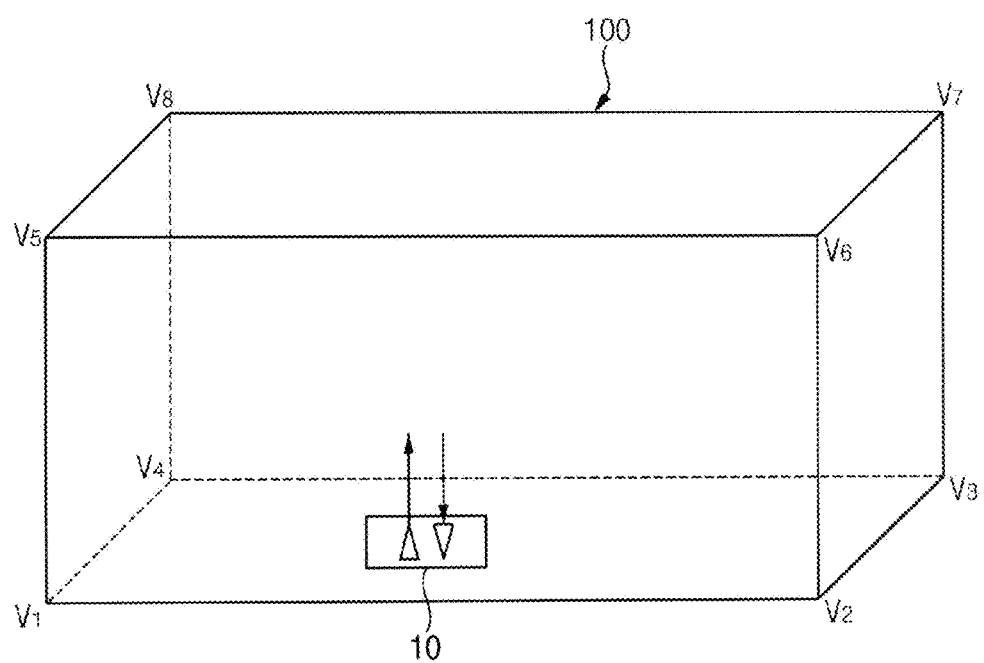
FIG. 1 shows an environment in which an indoor structure prediction apparatus predicts the shape of an indoor space using a radio signal received through a radio channel in the indoor space.

FIG. 1 illustrates an environment in which the indoor structure prediction apparatus 10 predicts the shape of an indoor space using a radio signal (wireless signal) received through a radio propagation channel in the indoor space 100.

Referring to FIG. 1, the indoor structure prediction apparatus 10 may predict the structure or shape of the indoor space 100 while being located in the indoor space 100. The structure of the indoor space 100 may be defined as, for example, coordinate values of vertices of corners of the indoor space 100. When the indoor space 100 is, for example, a hexahedron space, it may include a total of eight vertices $v_1, v_2, \ldots, v_8$ of the quadrangular floor and ceiling.

Figure 2:
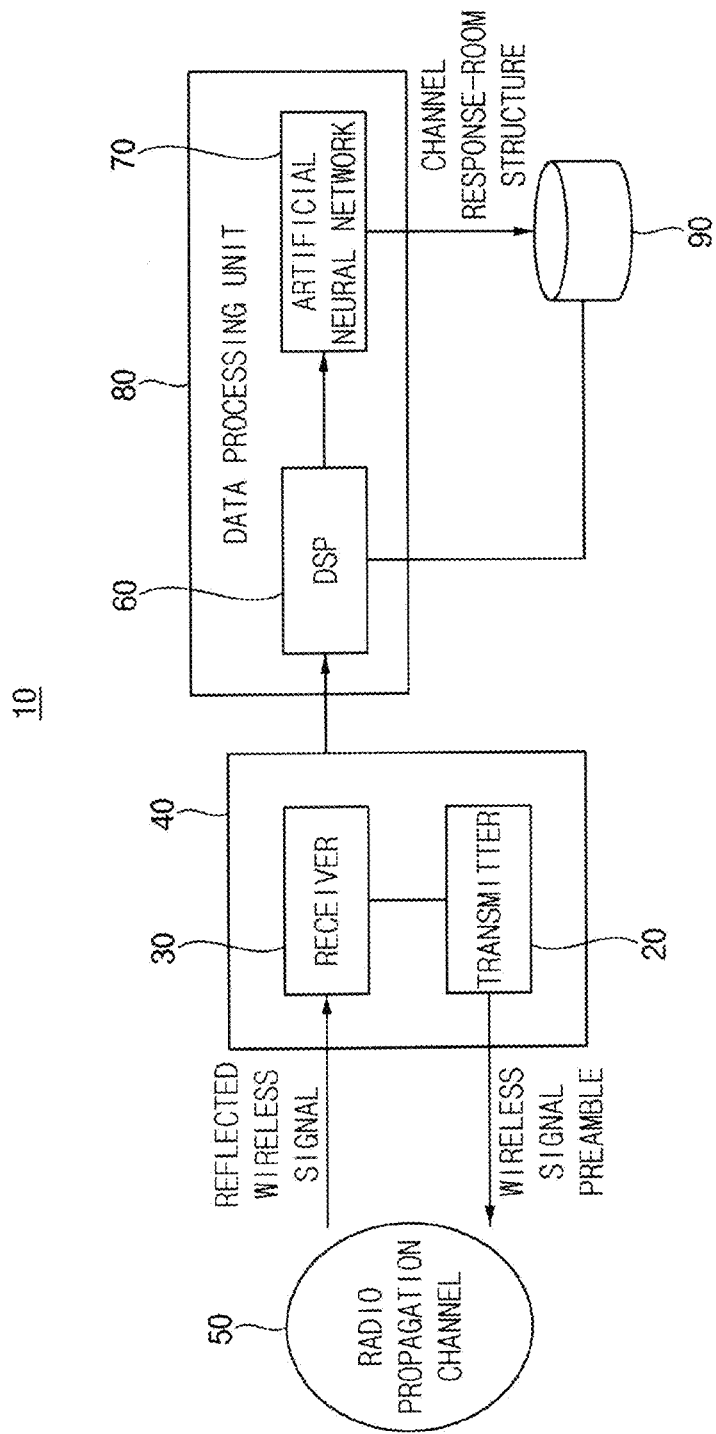
FIG. 2 is a block diagram schematically showing a configuration of an indoor structure prediction apparatus according to an example embodiment of the present disclosure.

FIG. 2 illustrates a block diagram which schematically shows the configuration of the indoor structure prediction apparatus 10 according to an example embodiment of the present disclosure.

Referring to FIG. 2, the indoor structure prediction apparatus 10 may include a transmitter 20 and a receiver 30. In an example embodiment, the transmitter 20 and the receiver 30 may be disposed close to each other. The transmitter 20 and the receiver 30 may be physically implemented as one device (hereinafter, referred to as a transceiver 40).

The transmitter 20 may transmit a radio signal to predict the structure of an indoor space. According to an example embodiment, the transmitter 20 may transmit a preamble signal x(t) of a radio signal. The preamble signal may be used to estimate a propagation channel by transmitting/receiving data before transmitting/receiving actual data in a communication system.

The radio signal transmitted from the transmitter 20 passes through the indoor space 100 and collides with walls, floors, ceilings, etc., and some may be reflected. The reflected radio signal may be received by the receiver 30 through such reflection. The receiver 30 may receive a signal y(t) indicating that the transmission signal x(t) has passed through the radio propagation channel 50. With respect to the signal received by the receiver 30, signal processing such as amplification of a signal received through the radio propagation channel 50, filtering for removing noise included in the received signal, extraction of an intermediate frequency signal, and conversion of an analog signal into a digital signal may be performed.

This signal processing may be performed by the receiver 30 or a data processing unit 80 to be described later.

The receiver 30 may estimate a propagation channel transfer function h(t) from the received signal y(t) and the transmitted signal x(t) as follows.

$$h(t)=I(y(t),x(t)) \qquad (1)$$

Here, I denotes a channel estimation function.

The shape, that is, the structure of the indoor space 100 may be predicted from the propagation channel transfer function h(t) in which information about the structure of the indoor space 100 is reflected.

The indoor structure prediction apparatus 10 may include the data processing unit 80 for processing the received signal transmitted from the receiver 30 and a data storage 90 for storing the processing result thereof. The data processing unit 80 may include a digital signal processor (DSP) 60 and an artificial neural network 70.

The DSP 60 may receive a digital reception signal from the receiver 30 and extract data of a predetermined channel parameter therefrom. According to an example embodiment, the predetermined channel parameter may include a PDP for a radio signal in the corresponding indoor space. In addition, the predetermined channel parameters may further include various propagation channel parameters, such as an AoA profile of a radio signal received by the receiver and/or an AoD profile of a radio signal transmitted from the transmitter 30.

According to an example embodiment, when the receiver 30 uses an omni-directional antenna, only the PDP can be estimated. In a typical communication system, the PDP may be estimated using an algorithm such as a least square algorithm or a least mean squared error algorithm. If the receiver 30 has an array antenna such as the 802.11ac standard, the AoA may be calculated using algorithms such as the multiple signal classification algorithm and estimation of signal parameters through rotation invariant techniques. If the transmitter 20 has an array antenna, the AoD may be extracted. When the transmitter 20 uses an array antenna, the AoD may be estimated using, for example, a Kalman filter. In order to test the applicability of the proposed method in various systems, the transceiver 40 may employ an omni-directional antenna or an array antenna having directivity.

The artificial neural network 70 can perform deep-learning on the correspondence between the propagation channel parameter data and the indoor space structure using the propagation channel parameter data provided by the DSP 60 and data on the structure of various indoor spaces. The deep-learning technique is a technique for estimating an answer when measuring new data after learning the system from accumulated data. The deep-learning technique may learn data in various structures according to a method of configuring the artificial neural network 70. In an example embodiment, the artificial neural network 70 may use a MLP framework to construct multiple hidden layers. The MLP structure will be described later. The artificial neural network 70 may be implemented as software implementing an algorithm to be described later and a processor capable of executing the software. Alternatively, the artificial neural network 70 may be implemented as a dedicated circuit capable of executing the algorithm to be described later.

Learning information secured through the deep-learning using the artificial neural network 70 may be stored in a data storage 90. The data storage 90 may be implemented using a non-volatile data storage device capable of retaining information even when the power is turned off.

Figure 3:
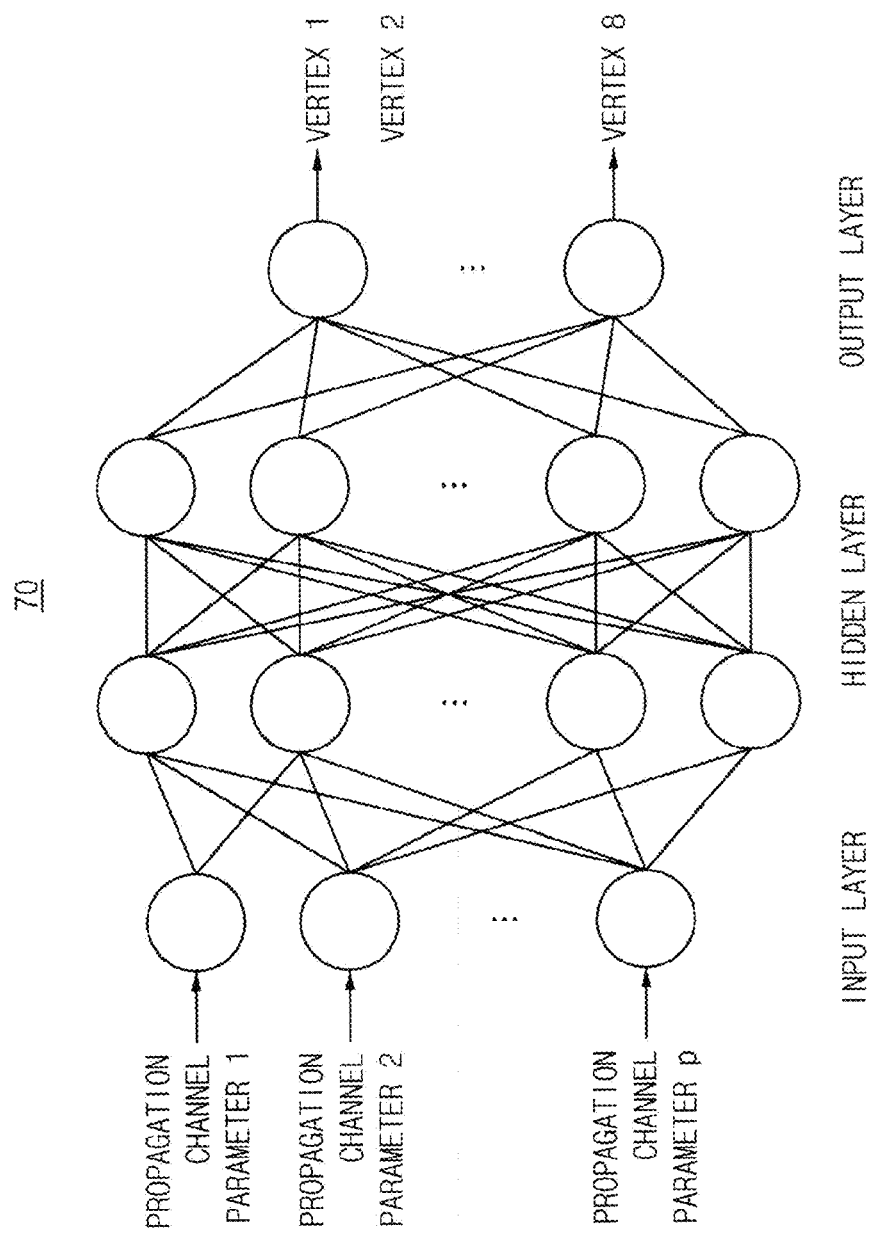
FIG. 3 illustrates a framework of an artificial neural network-based deep-learning method used to learn propagation channel parameters according to an example embodiment of the present disclosure.

FIG. 3 illustrates a framework of the artificial neural network 70 based deep-learning method used to learn propagation channel parameters according to an example embodiment of the present disclosure.

Referring to FIG. 3, when the artificial neural network 70 selects the $j^{th}$ (j=1, 2, . . . , p) channel parameter $\vec{S}_j=(s_{j1}, s_{j2} \ldots s_{ju})$ as an input parameters, all input parameters are chain-connected to the line and input parameters of the artificial neural network 70 may be set to $\vec{S}=\vec{S}_1 \oplus \vec{S}_2 \oplus \ldots \oplus \vec{S}_p$. Here, $\oplus$ denotes vector concatenation. The number of neurons used in the K hidden layers between the input layer and the output layer is set to $N_1, N_2, \ldots, N_K$. The output value of the artificial neural network 70 may be set as the coordinates of the vertices constituting the indoor space structure.

In an example embodiment, it may be assumed that an indoor space in the form of a cube is a general shape of an indoor space. In order to understand the shape of a cube-shaped indoor space using the input channel parameters, the artificial neural network 70 may return information corresponding to the coordinates of eight vertices constituting the cube as output values. Here, $v_i$ denotes a three-dimensional coordinate vector of each vertex.

When using the artificial neural network 70 configured according to the above process, the relationship between the input data and its output data for the artificial neural network 70 may be expressed as follows.

$$\vec{v}=f(\vec{s},\vec{w})=f^{(K)}(f^{(K-1)}(\ldots (f^{(1)}(\vec{s}))\ldots)) \quad (2)$$

Here, $f$ represents an activation function applied to each neuron $\vec{w}$ denotes weight constituting the artificial neural network 70. In order to construct such an input/output data relationship, the output may be calculated in each hidden layer as follows.

$$q_h^k = f^{(k)}\left(\sum_{i=1}^{N_{k-1}} w_{hi}^{(k)} q_i^{(k-1)}\right) \quad (3)$$

Here $q_h^{(k)}$ denotes a value output from the $h^{th}$ neuron of the $k^{th}$ hidden layer, and $w_{hi}^{(k)}$ denotes a weight between the $i^{th}$ neuron of the $(k-1)^{th}$ hidden layer and the $h^{th}$ neuron of the $k^{th}$ hidden layer.

The artificial neural network 70 framework configured as above may perform learning weights that minimize a prediction error through a back-propagation method.

Then, the learned artificial neural network 70 may serve to estimate the coordinates of vertices constituting an indoor space of an arbitrary building.

Figure 4:
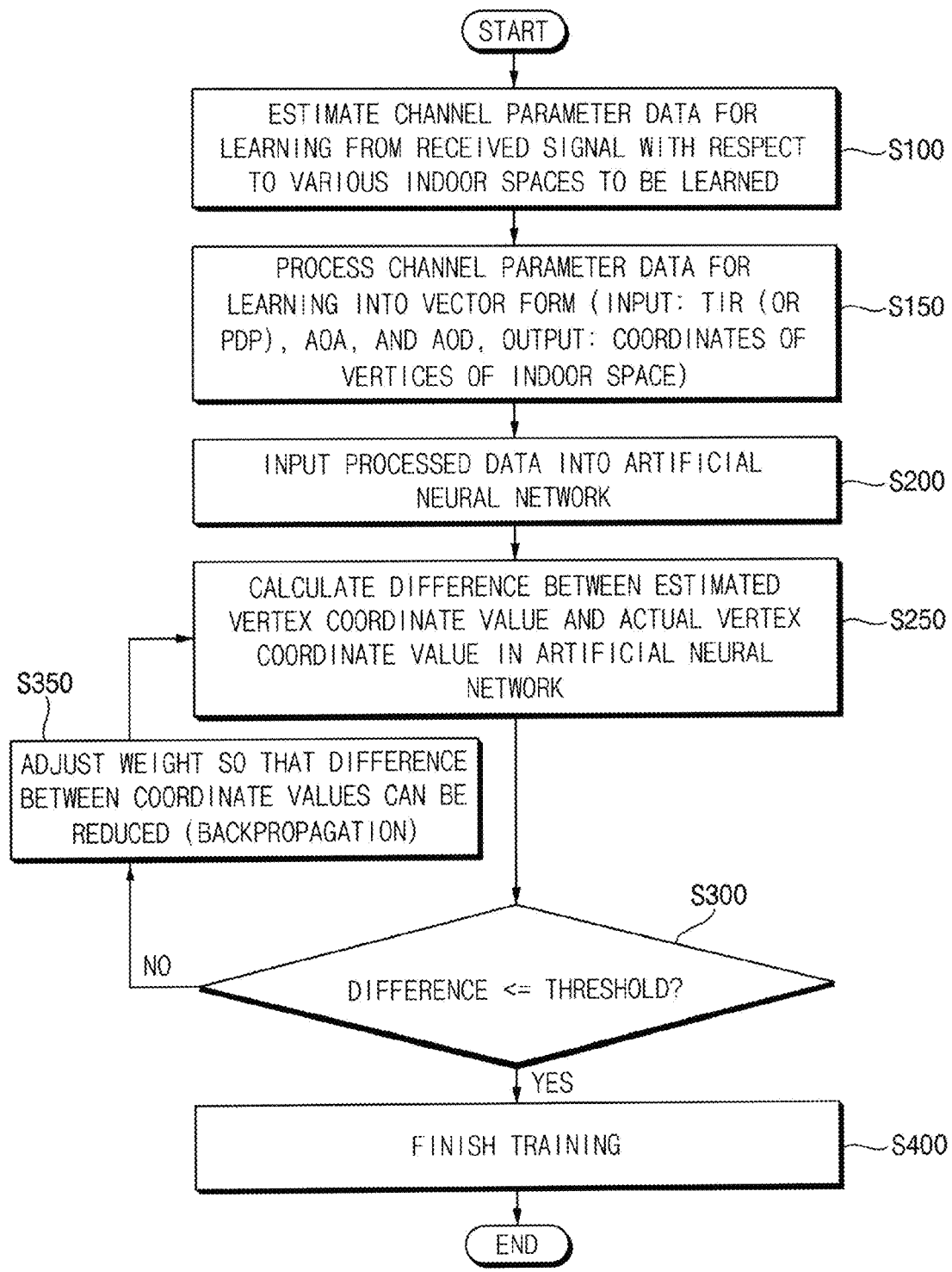
FIG. 4 is a flowchart illustrating a method of deep-learning propagation channel parameter data related to radio signals in indoor spaces of various structures using an artificial neural network according to an example embodiment of the present disclosure.

Next, FIG. 4 is a flowchart illustrating a method of deep-learning propagation channel parameter data related to radio frequency signals in indoor spaces of various structures using the artificial neural network according to an example embodiment of the present disclosure.

According to an example embodiment of the present disclosure, deep-learning may be performed using accumulated learning data, and the shape or structure of an indoor space may be predicted based on the deep-learned artificial neural network 70. This method has an advantage of being able to exploit features that heuristic algorithms cannot observe, especially in situations where no analytical solution is available.

Referring to FIG. 4, firstly the method for predicting the structure of an indoor space according to an example embodiment of the present disclosure may construct an artificial neural network learned. In order to construct the learned artificial neural network, propagation channel parameter data for learning may be extracted for various indoor spaces for learning (step S100). Here, the propagation channel parameter data for learning may be extracted for each of a plurality of indoor spaces to be learned. Specifically, the transmitter 20 may transmit a promised radio signal for learning within each indoor space that is a learning target. The receiver 30 located close to the transmitter 20 may receive a radio signal for learning that is reflected from the boundary of the corresponding indoor space and propagated through multiple propagation channel paths. The DSP 60 may analyze the radio signal received from the transceiver 40 to extract propagation channel parameter data for the indoor space. The extraction of the propagation channel parameter data may be performed while variously changing the position of the transceiver in the indoor space. Through this, it is possible to secure sufficient data for learning.

After sufficiently securing the propagation channel parameter data for learning for various indoor spaces, the propagation channel parameter data may be processed into a vector form suitable for learning in the artificial neural network 70. In addition, the coordinate values of the vertices of each indoor space for learning corresponding to each propagation channel parameter data may also be processed to be suitable for the artificial neural network 70 (step S150). The coordinate values of the vertices may be known values.

Next, the artificial neural network 70 uses the processed propagation channel parameter data for learning and the vertex coordinate values of the indoor space as input data to deep-learn the correspondence between the propagation channel parameter data for learning and the structure of the indoor space for learning. Through this, a learned artificial neural network can be built in advance.

Specifically, the propagation channel parameter data for learning processed in step S150 and the coordinate values of the vertices of the indoor space to be learned corresponding thereto may be provided to the artificial neural network 70 as input data (step S200).

The artificial neural network 70 may learn the input propagation channel parameter data for learning to obtain coordinate values of estimated vertices of the corresponding indoor space.

It may be possible to calculate a difference value between the estimated coordinate values of the vertices and the coordinate values of the actual vertices of the corresponding indoor space (step S250). The coordinate values of the actual vertices of the corresponding indoor space are provided as input values of the artificial neural network 70 in step S150.

The calculated difference value between the coordinate values may be compared with a predetermined threshold value (S300). As a result of the comparison, if the difference value between the coordinate values is equal to or less than the threshold value, it may be considered that the indoor space having the calculated coordinate values has a structure substantially similar to the actual indoor space, and thus learning may be terminated (step S400).

As a result of the comparison in step S300, if the difference between the coordinate values is greater than the threshold value, a weight may be adjusted to decrease the difference value (step S350). After returning to step S250, the estimated coordinate values of the vertices may be recalculated by applying the adjusted weight. Then, the difference value between the calculated vertex coordinate values and the coordinate value of the actual vertices of the corresponding indoor space is calculated again (step S250), and compared with a threshold value (step S300). According to the comparison result, the learning may be terminated (step S400). Alternatively, the step of adjusting the weight (step S350) may be performed again. This operation may be repeatedly performed until the difference value recalculated in step S250 becomes smaller than the threshold value.

Through this operation using the propagation channel parameter data for learning and the coordinate values of the vertices of the indoor space for learning as input data, a learned artificial neural network regarding the correspondence between the propagation channel parameter data for learning and the structures of the indoor spaces for learning can be built in advance. The correspondence data, which are obtained as a result of such learning, between the propagation channel parameter data and the structure of the indoor space may be stored in the data storage 90.

Deep-learning using the artificial neural network 70 will be described in more detail. Deep-learning techniques may mimic artificial neural networks by superimposing multiple hidden layers. In an example embodiment, a MLP framework such as that shown in FIG. 5 may be used to construct multiple hidden layers.

Figure 5:
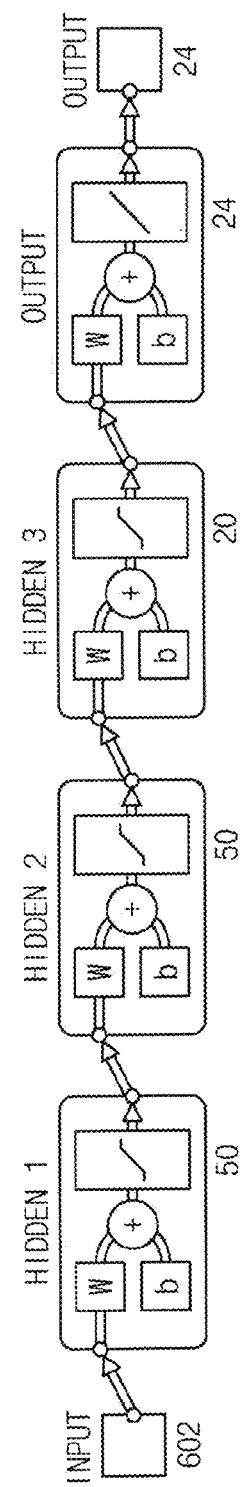
FIG. 5 illustrates an artificial neural network of a multi-layer perceptron (MLP) structure including multiple hidden layers as an example of an artificial neural network according to an example embodiment of the present disclosure.

Referring to FIG. 5, the artificial neural network 70 having a structure of a multi-layer perceptron may include one input layer, K hidden layers, and one output layer. In addition, each layer of the network may include multiple neurons. The output value that has passed through the neurons of each layer may be used as the input value of the next layer. At this time, each output value is transferred to the next layer after passing through the activation function. For each neuron, for example, sigmoid functions may be used as activation functions.

By letting the propagation channel parameter data of the indoor space be trained in the artificial neural network 70, an ability for estimating the structural form of the indoor space can be obtained. According to an example embodiment, in order to predict the shape of an indoor space, data of channel parameters such as PDP, AoA, and AoD may be used as an input of the artificial neural network 70.

It may be possible to analyze how the accuracy of indoor space shape prediction changes by changing the parameters used to predict the shape of the indoor space using a specific combination of these propagation channel parameters.

Figure 6:
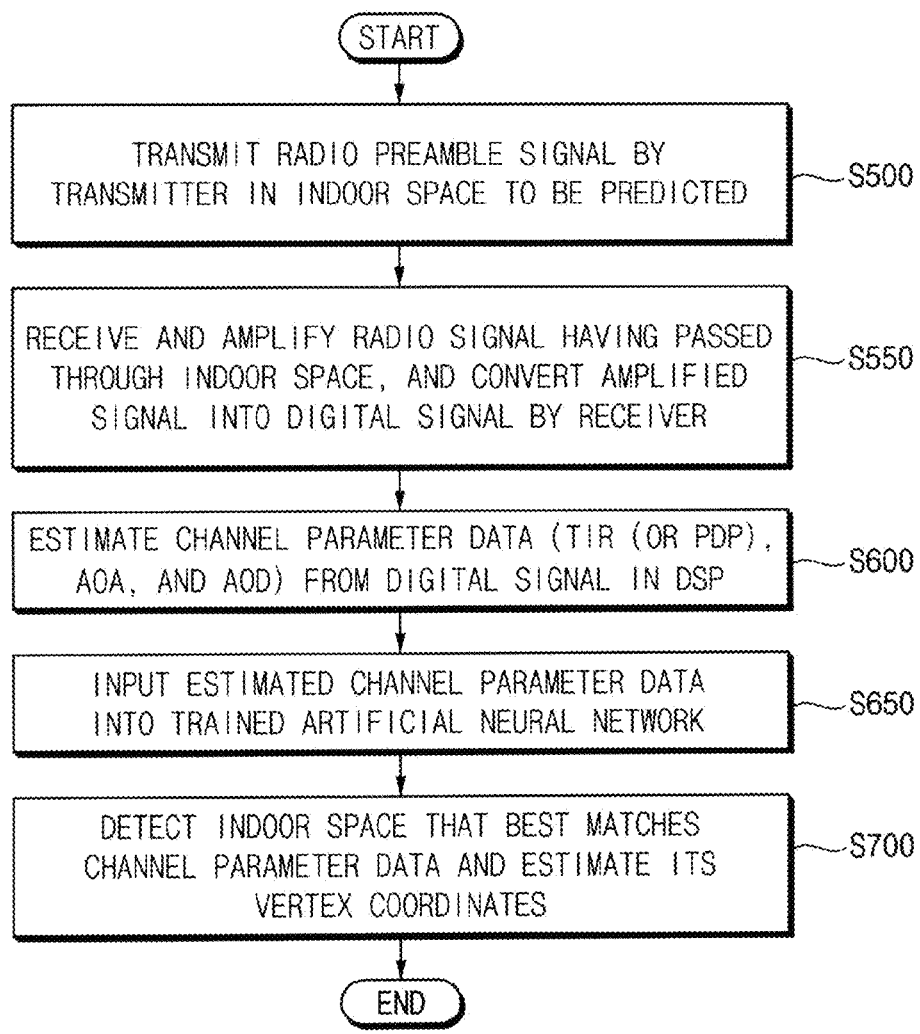
FIG. 6 is a flowchart illustrating a method of predicting the structure of a specific indoor space using a trained artificial neural network obtained through deep-learning according to an example embodiment of the present disclosure.

FIG. 6 shows a flowchart illustrating a method of predicting the structure of a specific indoor space using a learned artificial neural network secured through deep-learning according to an example embodiment of the present disclosure.

After preparation of the learned artificial neural network is made, it is possible to predict the structure of an indoor space, which is a prediction target, by using it. It is enough to extract the propagation channel parameter data for the indoor space to be predicted and detect the best matching indoor space structure through the learned artificial neural network.

Referring to FIG. 6, the transmitter 20 located in the indoor space to be predicted may transmit a radio signal (step S500). The signal transmitted by the transmitter 20 may be a wireless preamble signal.

The transmission signal may be received by the receiver 30 while passing through the paths of the radio propagation channel 50 in the indoor space (step S550). The receiver 30 may perform amplifying the received signal, removing noise, and converting the signal into a digital signal as described above. The processed signal as above may be provided to the DSP 60.

In the DSP 60, the propagation channel parameter data may be estimated from the digital received signal provided from the receiver 30 (step S600). The propagation channel parameter that may be used for this estimation may include the TIR (or PDP) of the radio signal. In addition, the propagation channel parameter that can be used for the estimation may further include the AoA profile and the AoD profile.

When the transmitter 20 and the receiver 30 of the transceiver 40 use an array antenna, the array antenna of the transmitter 20 and the receiver 30 may be rotated to produce the same effect as an omni-directional antenna. The array antenna has directivity. In case of using a directional antenna, the entire structure of the indoor space cannot be obtained by transmitting and receiving radio signals in only one direction. It is preferable to generate the same effect as using the omni-directional antenna by merging received signal data after transmitting and receiving signals while rotating the transmitting and receiving antenna. For example, when signals for one angle are combined three times while the antenna rotates, the received signal data may be merged by subtracting three gains from the summed data.

The DSP 60 may provide the estimated propagation channel parameter data for the corresponding indoor space as an input to the learned artificial neural network 70 (step S650).

Based on the trained artificial neural network 70, it may be possible to detect a structure of an indoor space that best matches the input propagation channel parameter data based on the learned data (model) stored in the data storage 90. The structure of the indoor space detected based on the best match can be provided as the structure of the indoor space to be predicted. Coordinate values of the vertices of the predicted indoor space can be also known. From the coordinate values of the vertices, it is possible to know what the shape of the interior space is.

As described above, the artificial neural network 70 may be used to determine the structure, that is, shape information of the indoor space. In order to properly train the artificial neural network 70 required for this, a large amount of propagation channel parameter data is required. The propagation channel parameter data for training the artificial neural network 70 by deep-learning may actually be obtained by transmitting and receiving radio signals in various indoor environments. Alternatively, according to an example embodiment of the present invention, in order to more efficiently obtain a sufficient amount of data for learning, an indoor 3D radio signal line tracking technique that provides channel parameters similar to the real environment and has proven performance may be used.

In the indoor 3D radio signal line tracking technique, the virtual path of the light beam may be calculated by generating an image of the transmitter 20 for each wall located in a given indoor space and connecting to the transmitter image the receiver 30 in a straight line. The calculated virtual path may be used to predict an actual path by folding the virtual path on the wall used to generate the image. A path calculated in 2-dimensional (2D) may be extended to a 3D path in consideration of height information. The output of each path may be calculated based on reflection, propagation and transmission losses. The power obtained from each path may be summed to predict the received signal strength at the receiving point.

Figure 7:
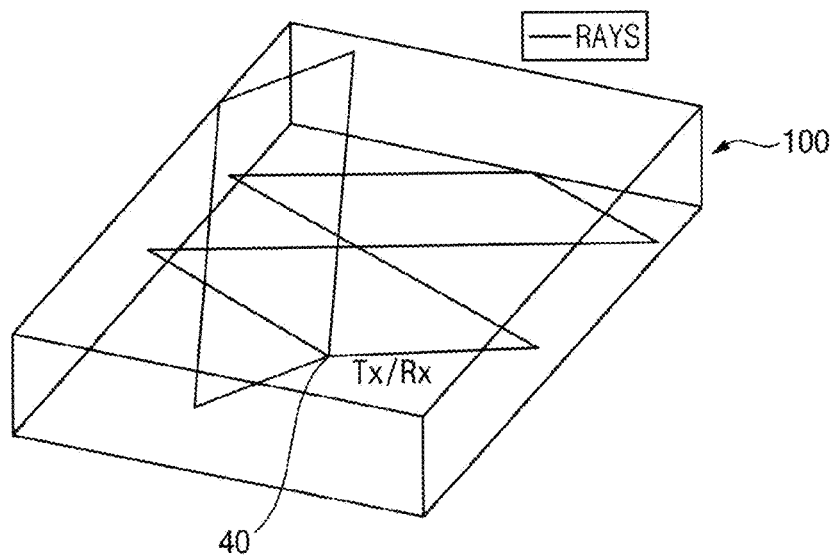
FIG. 7 schematically shows that a radio signal transmitted from a transmitter is received by a receiver through a part of multiple propagation paths in an indoor space using a radio signal line tracking technique.

FIG. 7 shows only a part of the light rays traced in the indoor building for a brief description of the indoor 3D radio signal line tracking technique. Referring to FIG. 7, the transceiver 40 is placed in a same device. The transceiver 40 may transmit a radio signal, and then receive a signal propagated through multipath. In the transceiver 40, the received signal may be analyzed to estimate propagation channel parameters (a channel response, AoA, and AoD). In an example embodiment, in order to obtain data necessary for learning the artificial neural network 70, the horizontal and vertical dimensions of the indoor space may be variously changed within a predetermined range (e.g., in a range from 5m to 22 m). When the horizontal and vertical lengths of the indoor space are $L_1$ and $L_2$, respectively, the position of the transceiver 40 may be set at a predetermined interval s in a space having a size of $(L_1-2d) \times (L_2-2d)$ which is reduced by a predetermined size d at both ends in the vertical and horizontal directions, respectively. In all environments, a height h of the receiver 30 may be a constant height or a variable height. In an actual simulation, the values of d and s may be set to, for example, 1 m, and h may be set to, for example, 1.5 m.

The present inventors obtained the learning data required to predict the structure of the indoor space and performed a simulation to evaluate the performance. The artificial neural network 70 framework may be configured differently depending on the type of channel parameter used. According to an example embodiment, the maximum delay time of the channel may be limited to, for example, 200 ns in order to keep the size of the input data constant. When the maximum time of arrival (ToA) is less than 200 ns, for example, the power of the path through which the signal arrives between the maximum ToA and 200 ns may be set to, for example, −2000 dBm. In this way, all input data may also be converted to a constant dimension. Table 1 summarizes an exemplary simulation environment and hyperparameters for a learning process of the artificial neural network 70.

TABLE 1

| Symbol | Parameter | Value |
| --- | --- | --- |
| $f_c$ | Center frequency | 5 GHz |
| $P_t$ | Transmission power | 20 dBm |
| K | Number of hidden layers | 3 |
| $N_i$ | Number of neurons per hidden layer | 50, 20, 20 |
| f | Activation function | Sigmoid function |

Figure 8:
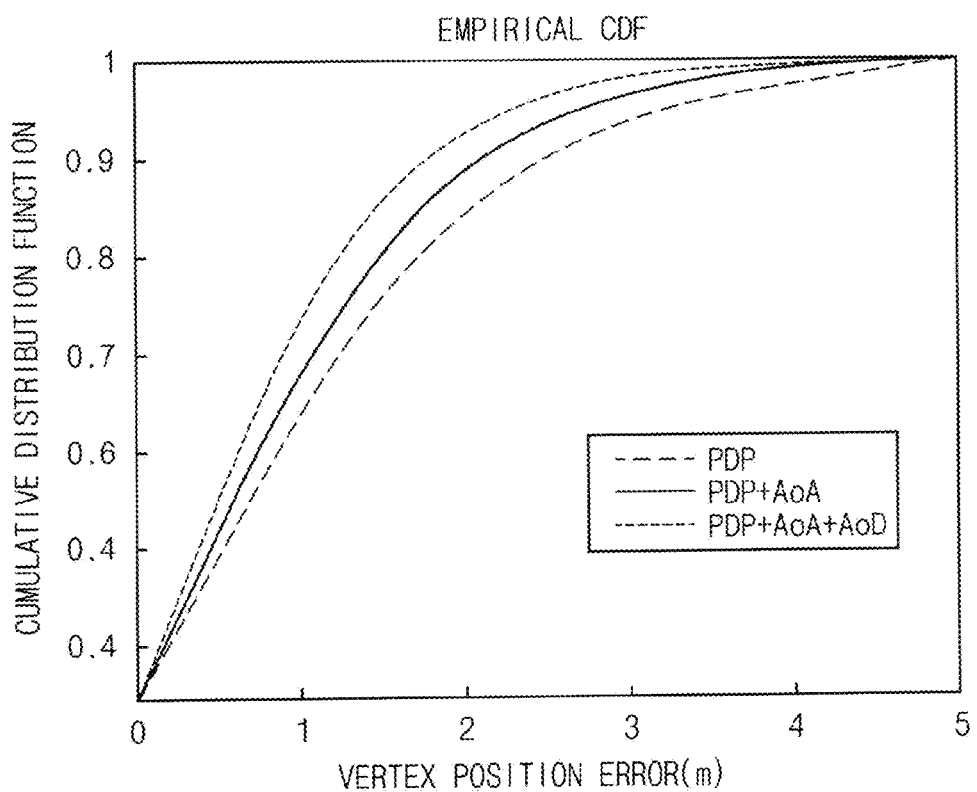
FIG. 8 is a graph analyzing the performance of predicting the structure of an indoor space using an empirical cumulative distribution function.

In the exemplary simulation, a total of 324 indoor space environments and 50505 radio propagation channel parameter data were generated through the indoor 3D radio signal line tracking technique and used for learning, verification and performance test. In addition, 70%, 15%, and 15% of the generated radio propagation channel parameter data were used as training, validation and performance test sets, respectively. Data sets for training, validation and performance test were randomly divided. The performance analysis described below is based on numerical results obtained from the data set for the performance test. FIG. 8 shows a cumulative distribution function (CDF) of vertex position estimation errors for various input data. The CDF shows that the best performance is obtained when training is performed using as much information as possible, such as PDP, AoA, and AoD. The reason is that as the number of parameters used for learning increases, information about the shape of an indoor space included in the received radio signal is more accurately learned by the artificial neural network 70. In view of this, it is desirable to predict the shape of the indoor space by collecting data on as many radio signals as possible.

Figure 9:
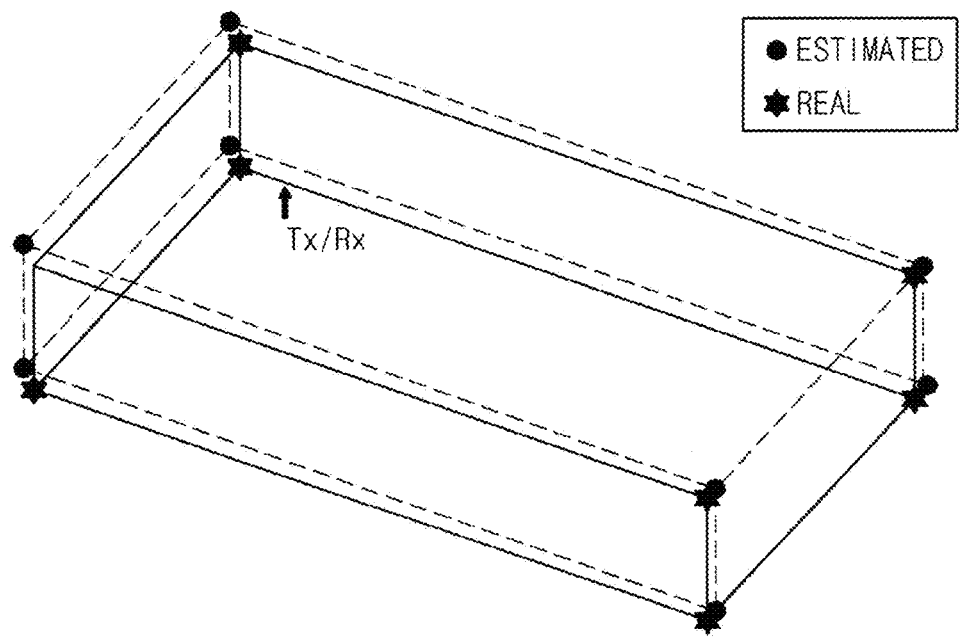
FIG. 9 illustrates a result of predicting the structure of an indoor space using a deep-learning method according to an example embodiment of the present disclosure.

FIG. 9 illustrates a result of predicting the shape of an indoor space using the a deep-learning method. Referring to FIG. 9, it can be seen that the predicted shape of the indoor space (a hexahedron shape indicated by a dotted line) is almost identical to the actual shape of the indoor space (a hexahedron shape indicated by a solid line).

Figure 10:
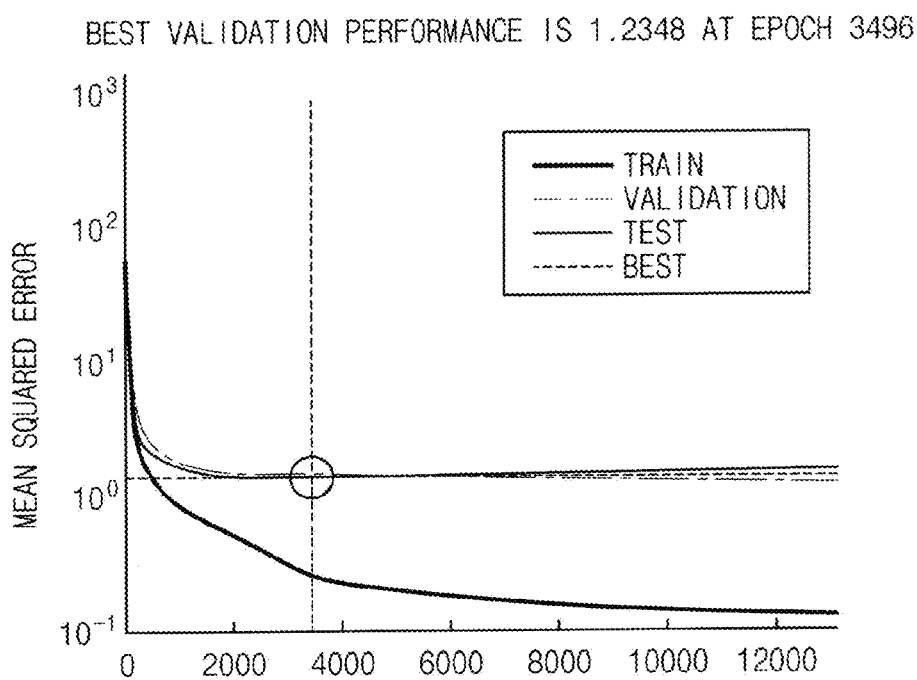
FIG. 10 is an epoch-mean-square error graph for accuracy analysis of learning and validation of the method according to the present disclosure.

To check whether an overfitting problem occurs in the prediction of using the artificial neural network 70, FIG. 10 illustrates an epoch and mean square error graph for learning and validation accuracy using the artificial neural network. In general, when overfitting occurs, training and validation test accuracies differ significantly. As shown in FIG. 6, the small differences in learning and validation accuracy for 3496 epochs indicate that overfitting did not occur in the learned artificial neural network 70.

By analyzing the error according to the volume of the indoor space and the change in the error according to the position of the transceiver 40, it may be possible to investigate whether the error varies depending on the size of the indoor space or the position of the transceiver 40. FIG. 11 shows the results of analyzing the performance difference according to the environmental change. FIG. 11 (a) shows a change in the estimation error of the vertex position of the indoor space according to the change in the size of the indoor space. Both variables have positive correlation coefficients, but the slope between them are not significantly high. Therefore, it can be seen that the error does not change significantly according to the change in the size of the indoor space. However, when the volume of the room is excessively large, the estimation error slightly increases compared to the average of the estimation error from the test set. The reason is that the statistical value of PDP changes rapidly when the size of the indoor space is significantly different from the average. Therefore, in order to eliminate the difference in performance depending on the size of the indoor space, a process of preprocessing for properly learning the artificial neural network 70 may be performed in consideration of the relationship between the size of the indoor space and the channel parameters.

FIG. 11 (b) shows a relationship between a relative distance ($r_{rel}=r/V^{1/3}$) of the transceiver 40 from the center of the indoor space and a normalized estimation error ($e_n=e/A^{1/2}$) with respect to the vertex position of the indoor space. Here, e is the estimation error of the vertex position of the indoor space, and A is the area of the indoor space. In addition, r is the distance from the center of the indoor space to the position of the transceiver 40, and V is the volume of the indoor space. According to of FIG. 11 (b), since the correlation $R^2$ between the estimation error and the relative distance appears low, it can be seen that there is no clear relationship between them. It can be seen that the learned artificial neural network 70 can show excellent estimation accuracy without showing a performance difference with respect to the estimation of the vertex position according to the position of the transceiver 40 in the indoor space. Therefore, it can be seen that the prediction of the indoor space through the artificial neural network 70 does not change significantly depending on the environment.

As described above, the present disclosure performs the prediction of the structure of an indoor space using radio signals, that is, a wireless signal through the deep-learning technique. The present disclosure utilizes the accumulated data in an algorithm. Various propagation channel parameters such as the PDP, the AoA profile, and the AoD profile obtained in various environments are used for training the artificial neural network 70. Then, the propagation channel parameters obtained in the indoor space to be predicted are analyzed based on the trained artificial neural network 70 to predict the structure of the indoor space. Since the present method has few heuristic aspects, environmental changes do not significantly affect the performance of the algorithm according to the present disclosure.

The indoor structure prediction apparatus 10 described above may be implemented as a hardware component, a software component, and/or a combination of a hardware component and a software component. The method according to the example embodiments may be implemented in the form of program instructions that can be executed through various computer means and recorded in a computer-readable medium. The computer-readable medium may include program instructions, data files, data structures, etc. alone or in combination. The program instructions recorded on the medium may be specially designed and configured for the example embodiment, or may be known and available to those skilled in the art of computer software.

As described above, although the embodiments of the present disclosure have been described with reference to the limited embodiments and drawings, various modifications and variations are possible from the above description by those of ordinary skill in the art. For example, even if the described techniques are performed in an order different from the described method, and/or the described components of the system, structure, apparatus, circuit, etc. are combined or coupled in a different form than the described method, or replaced or substituted by other components or equivalents, an appropriate result may be achieved. Therefore, other implementations, other embodiments, and equivalents to the claims are also within the scope of the following claims.

What is claimed is:

1. A method for predicting a structure of a target indoor space to be predicted using deep-learning-based radio propagation channel analysis, comprising:

estimating, by a data processing device, propagation channel parameter data for each of a plurality of training indoor spaces, by using training radio signals received by a first transceiver through multiple propagation channel paths after being transmitted by the first transceiver, while changing a position of the first transceiver in each of the plurality of training indoor spaces;

performing, by the data processing device with an artificial neural network, learning the estimated propagation channel parameter data of each of the plurality of training indoor spaces and coordinates of vertices of each of the plurality of training indoor spaces to obtain correspondence between structures of training indoor spaces and propagation channel parameter data thereof;

transmitting first radio signals in the target indoor space to receive the first radio signals, by a second transceiver, reflected in the target indoor space through multiple propagation channels;

estimating, by the data processing device, first propagation channel parameter data from the received first radio signals provided by the second transceiver; and predicting, by the data processing device, a structure of the target indoor space that best matches the estimated first propagation channel parameter data of the target indoor space to be predicted based on the artificial neural network trained with respect to the correspondence.

2. The method of claim 1, wherein the estimating of the propagation channel parameter data comprises transmitting, by the first transceiver, the training radio signals in each of the training indoor spaces; receiving, by the first transceiver, the training radio signals having passed through the multiple propagation channel paths in each of the plurality of training indoor spaces; and estimating, by the data processing device, the propagation channel parameter data for each of the plurality of training indoor spaces by analyzing the received training radio signals.

3. The method of claim 2, wherein the propagation channel parameter data include data obtained by using at least one of a power delay profile, an angle of arrival profile and an angle of departure profile of the radio signal as a propagation channel parameter.

4. The method of claim 3, wherein when the first transceiver uses an omni-directional antenna, the power delay profile of the training radio signals is estimated as the propagation channel parameter data.

5. The method of claim 4, wherein the power delay profile is estimated using a least-square method or a least-mean-square error method.

6. The method of claim 3, wherein when the first transceiver uses an array antenna having directivity, the angle of arrival profile of the training radio signals is estimated as the propagation channel parameter data.

7. The method of claim 3, wherein when the first transceiver uses an array antenna having directivity, the angle of departure profile of the training radio signals is estimated as the propagation channel parameter data.

8. The method of claim 1, wherein the first 'transmitting first radio signals to receive the first radio signals' is performed while rotating array antennas of a transmitter and a receiver of the second transceiver when the transmitter and the receiver of the second transceiver use the array antennas having directivity; and wherein the data of the first radio signals received while rotating the antennas are merged to generate an effect which is the same as an omni-directional antenna.

9. The method of claim 1, wherein the 'performing learning the estimated propagation channel parameter data' comprises: providing the coordinate values of the vertices of each of the plurality of indoor spaces and the propagation channel parameter data as input data for deep-learning of the artificial neural network; deep-learning, in the artificial neural network, the input propagation channel parameter data to obtain coordinate values of estimated vertices of corresponding indoor space; calculating a difference value between the coordinate values of the estimated vertices and coordinate values of actual vertices of the corresponding indoor space; adjusting a weight so that the difference value is reduced; and repeating calculating the difference value again by applying the adjusted weight, and terminating deep-learning the correspondence when the calculated difference value becomes smaller than a threshold value.

10. The method of claim 1, wherein the 'predicting a structure of the target indoor space' comprises: inputting the estimated first propagation channel parameter data into the trained artificial neural network to detect a structure of the target indoor space that best matches the estimated first propagation channel parameter data; and estimating coordinate values of vertices of the target indoor space based on the detected structure as the coordinate values of the vertices of the target indoor space to be predicted.

11. The method of claim 1, wherein the first radio signals transmitted by the second transmitter is a preamble signal.

12. The method of claim 1, wherein when the second transceiver uses an omni-directional antenna, a power delay profile of the first radio signals is estimated as the first propagation channel parameter data.

13. The method of claim 12, wherein when the second transceiver uses an array antenna having directivity, an angle of arrival profile of the first radio signals is further estimated as the first propagation channel parameter data.

14. The method of claim 12, wherein when the second transceiver uses an array antenna having directivity, an angle of departure profile of the first radio signals is further estimated as the first propagation channel parameter data.

15. The method of claim 1, wherein the first propagation channel parameter data includes at least any one of (i) power delay profile data of the first radio signals, and (ii) the power delay profile data of the first radio signals and at least one of angle of arrival profile data and angle of departure profile data of the first radio signals.

16. The method of claim 1, wherein the artificial neural network is an artificial neural network having a multi-layer perceptron structure.

* * * * *